(No Model.)
J. C. & V. C. MacSPADDEN.
VALVE FOR PNEUMATIC TUBES.
No. 568,362. Patented Sept. 29, 1896.
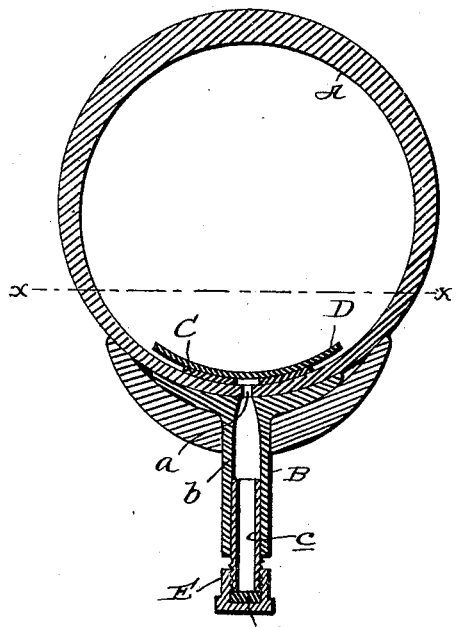
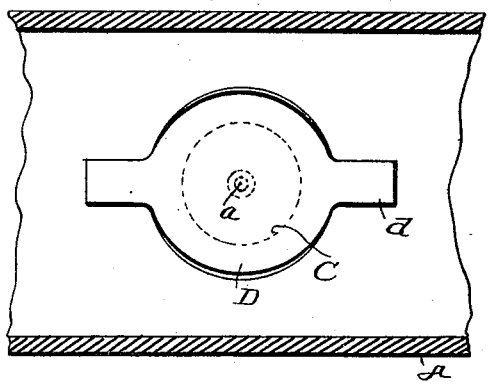
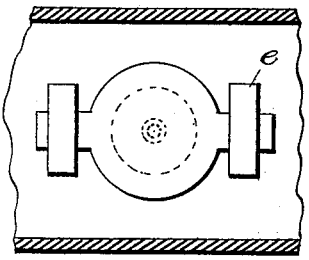
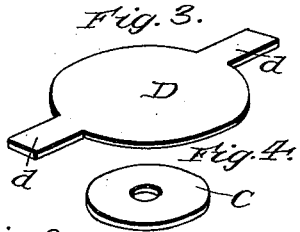
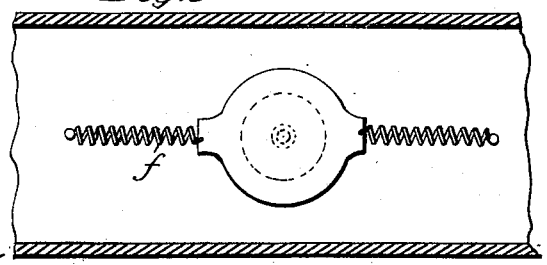
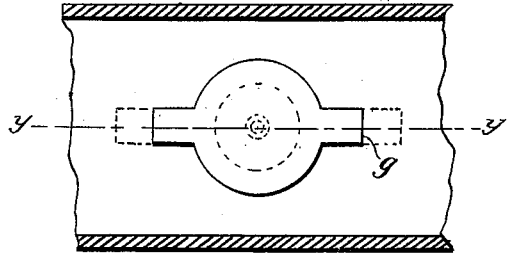
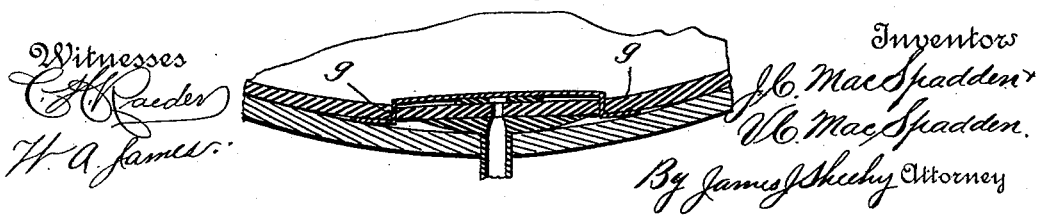
Witnesses
Inventors
J. C. MacSpadden
V. C. MacSpadden
By James J. Sheehy Attorney
THE NORRIS PETERS CO., PHOTO-LITHO., WASHINGTON, D. C.

UNITED STATES PATENT OFFICE.

JOHN C. MACSPADDEN AND VOLNEY C. MACSPADDEN, OF ST. JOSEPH, MISSOURI.

VALVE FOR PNEUMATIC TUBES.

SPECIFICATION forming part of Letters Patent No. 568,362, dated September 29, 1896.

Application filed March 9, 1896. Serial No. 582,442. (No model.)

*To all whom it may concern:*

Be it known that we, JOHN C. MACSPADDEN and VOLNEY C. MACSPADDEN, citizens of the United States, residing at St. Joseph, in the county of Buchanan and State of Missouri, have invented certain new and useful Improvements in Valves for Pneumatic Tubes and other Devices; and we do declare the following to be a full, clear, and exact description of the invention, such as will enable others skilled in the art to which it appertains to make and use the same.

Our invention relates to valves for pneumatic or air-inflated tires and other devices, such as foot-balls, punching-bags, and the like; and it has for its general object to provide a non-return or check valve which is very cheap and simple and is easily attached to a tire, foot-ball, or other device, and one which is adapted to permit the free entry of air into the tire or other device to inflate the same, and is also adapted to effectually prevent the escape of air, whereby it will be seen that the tire or other device may be very quickly and thoroughly inflated, and when inflated will remain so.

To the attainment of the foregoing the invention consists in the peculiar construction, novel combination, and adaptation of parts hereinafter described, and particularly pointed out in the claims appended.

In the annexed drawings, Figure 1 is a transverse section of a pneumatic tire equipped with our improvements. Fig. 2 is a sectional view taken in the plane indicated by the line $x\ x$ of Fig. 1. Fig. 3 is a perspective view of the valve removed. Fig. 4 is a similar view of the valve-seat. Figs. 5, 6, and 7 are sections of a tire, taken in about the plane indicated by the line $x\ x$ of Fig. 1 and illustrating modifications; and Fig. 8 is a section taken in the plane indicated by the line $y\ y$ of Fig. 7.

Referring by letter to the said drawings, A indicates the air-tube of a pneumatic tire, which is provided with the air-induction aperture $a$.

B indicates the unobstructed inflation-tube, which communicates with the aperture $a$, and may be of any suitable construction and may be connected with the tube A in any approved manner, although we prefer to form it of the rubber portion $b$, which is connected with or formed integral with the tube A, and the metallic portion $c$, which is secured inside or outside the portion $b$, as desired.

C indicates a valve-seat, of sheet-rubber or other suitable material, which is preferably arranged around the aperture $a$ and connected to the inside of the tube A, as shown, and D indicates our improved non-return or check valve. This valve D may be formed of silk, silk and rubber, or any fabric or other material that will resist the passage of air, but we prefer to form it of a thin piece of rubber, which, on account of its resiliency, is superior to any other material, as will be presently appreciated. The said valve D may be of any suitable form, but we prefer to have it comprise a circular body $c$, which is designed to rest over the aperture $a$ of the tube A, as illustrated, and the diametrically opposite branches $d$, which are designed to be connected with the tube A by rubber cement.

In connecting the valve to the tube A it is laid its full length upon the inside of the tube and its branches are then connected with the said tube. In virtue of this it will be seen that when air is forced inwardly through the tube B and the aperture $a$ the valve will be moved away from the aperture $a$, so as to permit of free ingress of the air to the tire to inflate the same, and it will also be seen that immediately following the cessation of inflation the pressure of air in the tube A will quickly force and hold the valve against its seat and the escape or return of the air from the interior of the tire to the atmosphere will be effectually prevented; and it will further be appreciated that the greater the pressure within the tube A the greater the force with which the valve is returned to and held against its seat to prevent the escape of the air. In virtue of this it will be appreciated that the tire may be rendered very "hard" and kept so, and as the valve closes immediately upon a cessation of the movements of the air-inflating pump it will be seen that no air can escape from the tube A during the inflation thereof, and therefore said tube may be inflated in a short time, which is an important advantage and a desideratum in this class of devices.

The valve, arranged as described, will open to permit of free ingress of air to the tube A and will be immediately and securely closed when the inflation ceases, notwithstanding what kind of flexible material it is made of, but it will be readily observed that when the valve is formed of thin rubber, which is the preferable material, it will be stretched during the inflation of the tire to permit of a free entry of the air and will instantly spring back to its normal position against the seat when the inflation is stopped. It will also be observed that when the valve and its seat are made of rubber the one pressed against the other will effectually resist the passage of air between them.

It will be readily observed from the foregoing that the improved valve, while highly efficient, is extremely simple, and as it embodies but the seat C and the sheet-rubber valve D, both of which may be connected to the tube A by rubber cement, it may be produced very easily and cheaply, and consequently does not add materially to the cost of the tube A.

As before stated, the inflation-tube is not obstructed by a valve or any other device, and therefore, in order to prevent dust, grit, &c., from entering said tube and impeding the operation of the valve, we screw-tap the outer end of the tube for the engagement of the cap E. (Illustrated in Fig. 1.) This cap is provided with a disk F, of rubber, leather, or other suitable material, which, when the cap is screwed on the tube, will bear against the end of the tube and effectually prevent even the finest particles of dust and grit from getting into the tube and thereby gaining access to the valve.

When desired, the connection of the branches d of the valve D to the tube A may be reinforced by the cross-strips e, of rubber, (see Fig. 5,) which may be connected to the branches and to the tube A by rubber cement or any other suitable means. The connection of the valve with the tube A may also be effected by coiled springs f, as shown in Fig. 6. Another manner of connection is shown in Figs. 7 and 8, in which the branches d of the valve are passed through slits g in the tube and are connected to the outer side of the tube by rubber cement or other suitable means, the slits g being also closed in an air-tight manner by rubber cement or other suitable meams.

While we have described our improved valve and inflation-tube as applied to the air-tube of a bicycle-tire, we desire it distinctly understood that the improvements are applicable to foot-balls, punching-bags, and all other devices that are inflated or designed to be inflated.

A removal of the compressed air from the tire may be effected when desired by inserting a blunt-pointed pin in through the inflation-tube, so as to press and hold the valve away from its seat.

Having described our invention, what we claim, and desire to secure by Letters Patent, is—

1. The combination of a device such as a wheel-tire adapted to be inflated and having an aperture a, the annular sheet-rubber seat C, arranged upon the inside of the tire and around the aperture a, and secured by rubber cement to such inside of the tire, and the valve formed of a sheet of flexible material arranged within the tire and over the seat C, and aperture a, and connected by rubber cement to the tire, substantially as and for the purpose set forth.

2. The combination of a device such as a wheel-tire adapted to be inflated and having an aperture a, and also having slits g, on opposite sides of the aperture a, and the valve formed of a sheet of flexible material arranged within the tire and over the aperture a, and having branches extended through the slits g, and secured to the outer side of the tire, substantially as and for the purpose set forth.

In testimony whereof we affix our signatures in presence of two witnesses.

JOHN C. MacSPADDEN.
VOLNEY C. MacSPADDEN.

Witnesses:
JNO. E. CHAPMAN,
ROBERT A. DANIEL.